United States Patent [19]
Burnett

[11] 3,789,737
[45] Feb. 5, 1974

[54] SELF-PURGING BRAKE ACTUATOR
[75] Inventor: Richard T. Burnett, South Bend, Ind.
[73] Assignee: The Bendix Corporation, South Bend, Ind.
[22] Filed: Mar. 27, 1972
[21] Appl. No.: 238,547

[52] U.S. Cl.................... 91/416, 91/422, 91/438, 91/452
[51] Int. Cl. F15b 15/17, F15b 11/08, F15b 13/042
[58] Field of Search. 41/438, 439, 416, 452; 91/422

[56] References Cited
UNITED STATES PATENTS
| | | | |
|---|---|---|---|
| 300,401 | 6/1884 | Sjogren | 91/422 |
| 487,132 | 11/1892 | Smith | 91/438 |
| 2,742,878 | 4/1956 | Glenny et al. | 91/438 |
| 2,755,779 | 7/1956 | Muller | 91/438 |
| 2,778,339 | 1/1957 | Mancusi, Jr. | 91/438 |
| 3,476,019 | 11/1969 | Berg et al. | 91/438 |

FOREIGN PATENTS OR APPLICATIONS
200,459   11/1958   Austria ................ 91/422

Primary Examiner—Paul E. Maslousky
Attorney, Agent, or Firm—Ken C. Decker; William H. Antonis

[57] ABSTRACT

A brake actuator is disclosed for fluid pressure actuating braking system. The actuator includes an actuating piston slidably mounted within a housing and defining a pair of pressure chambers between opposite ends of the piston and corresponding ends of the housing. High pressure fluid is communicated into one of the chambers where it acts upon the end of the piston to drive the latter in a brake actuating direction. A check valve permits air to exhaust from the other chamber, but prevents atmospheric air from being drawn into the latter when the piston is returned upon release of the brake. A sleeve is slidable relative to the piston and moves relative to the latter when the piston is actuated to prevent communication between the chambers during a brake actuation, but opens the passage upon return movement of the piston upon release of the brakes to permit fluid in the one chamber to communicate into the other chamber, thereby preventing contamination of the latter by atmospheric air.

3 Claims, 1 Drawing Figure

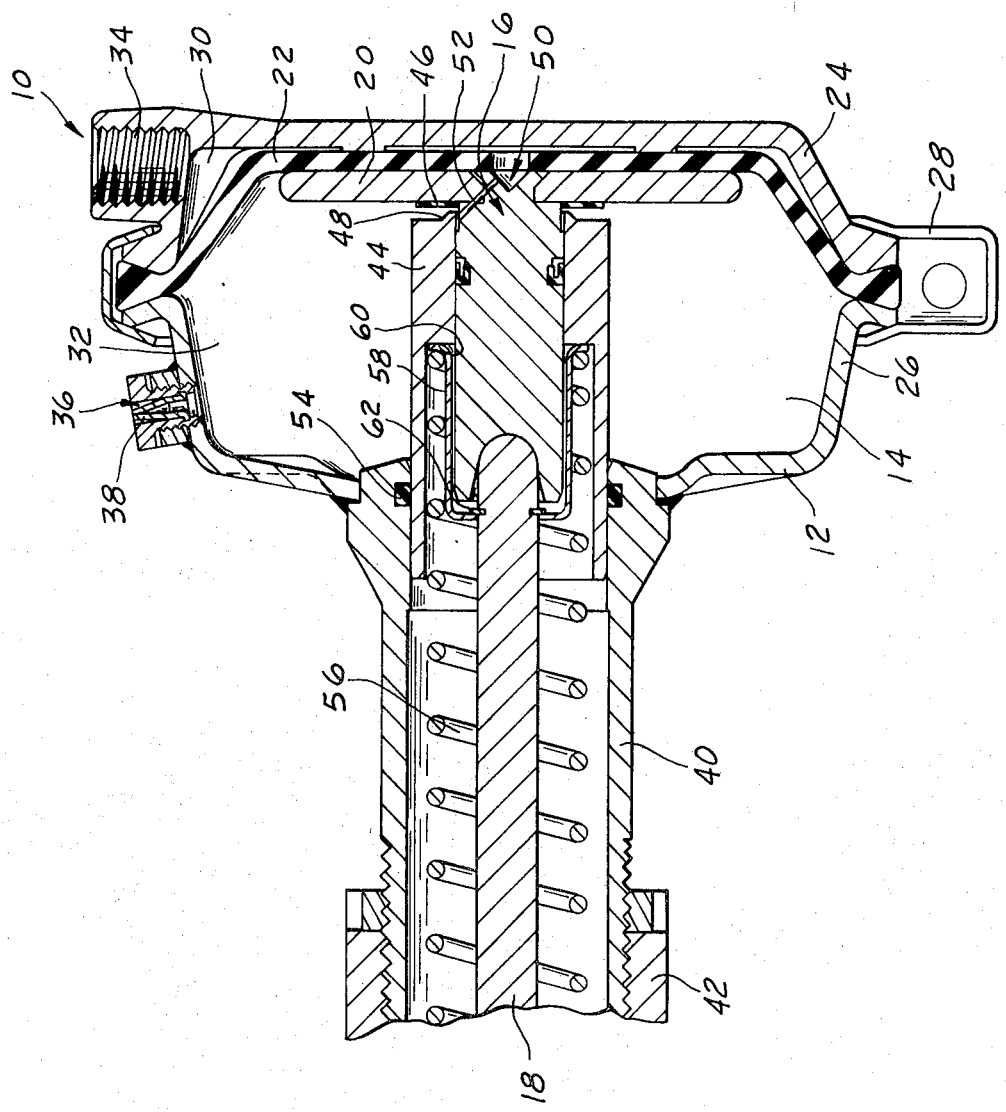

SELF-PURGING BRAKE ACTUATOR

BACKGROUND OF THE INVENTION

This invention relates to a brake actuator for use in a fluid pressure braking system.

Existing brake actuators provide an actuating piston reciprocable within a housing which is actuated by admitting fluid pressure into the chamber defined between one end of the piston and a corresponding end of the housing. However, this construction requires that the chamber defined between the opposite side of the piston and the wall of the housing be vented to the atmosphere, so that during the actuating stroke of the piston fluid is expelled and during the return stroke of the piston upon release of the brakes atmospheric air is drawn into the actuator. As is well known to those skilled in the art, brake actuators of the type disclosed herein are conventionally mounted on the underside of a vehicle where road splash and other contaminants establish an extremely adverse environment. Consequently, when atmospheric air is drawn into the actuator upon return movement of the piston, the contaminants are also drawn into the housing, thus damaging the walls of the housing and seals used within the actuator. The problem becomes particularly acute after a period of time, as the contaminants introduced into the actuator eventually are drawn into the brake mechanism itself, where they damage the components thereof and may cause a brake failure.

SUMMARY OF THE INVENTION

Therefore, an important object of my invention is to provide a contamination-resistant fluid pressure brake actuator.

Another important object of my invention is to provide a brake actuator in which the high pressure fluid in the high pressure chamber scavenges the non-pressure chamber when the actuating piston is returned upon release of the brakes.

Still another important object of my invention is to provide a brake actuator in which a check valve permits fluid to be expelled from the actuator into the atmosphere, but which prevents atmospheric air from being drawn into the actuator.

DESCRIPTION OF THE DRAWING

The sole FIGURE of the drawing is a cross-sectional view of a brake actuator made pursuant to the teachings of my present invention.

DETAILED DESCRIPTION

Referring now to the drawing, a brake actuator generally indicated by the numeral 10 includes a housing 12 defining compartment 14 therewithin. A piston generally indicated by the numeral 16 reciprocates within the housing 12 and includes an actuating rod 18 and a plate-like portion 20. An annular flexible resilient diaphragm 22 is bonded to the plate-like section 20, and the outer peripheral edge of the diaphragm 22 is sealingly received between sections 24 and 26 of the housing 12, which are held together by an annular ring 28. The diaphragm 22 and the plate-like portion 20 therefore divide the compartment 14 into a pair of chambers 30 and 32, respectively. An inlet port 34 communicates the chamber 30 to a source of air pressure when the vehicle operator effects a brake application. A one-way check valve mechanism generally indicated by the numeral 36 communicates the chamber 32 with the exterior of the housing 12. The check valve mechanism 36 includes a resilient valve member 38 of the so-called "duck-bill" type, as more completely disclosed in U. S. Pat. No. 3,122,161 owned by the assignee of the present invention and incorporated herein by reference. Suffice it to say, however, that the resilient member 38 permits air to flow from the chamber 32 when the pressure in the latter exceeds atmospheric pressure, but prevents atmospheric air from being drawn into the chamber 32 when the pressure level in this chamber is below atmospheric pressure.

One end of a neck-like portion 40 of the housing 12 is secured to the section 26 of the latter, and the other end of the neck-like portion is secured to a housing 42 which provides a portion of the brake housing. The housing 42 is a part of the caliper housing if the actuator 10 is used to actuate a disc brake of the type disclosed in co-pending U. S. Pat. application Ser. No. 156,746, filed June 25, 1971, owned by the assignee of the present invention and incorporated herein by reference. If the actuator 10 is used to actuate a wedge-type brake of the type illustrated in U. S. Pat. No. 3,362,506, owned by the assignee of the present invention and incorporated herein by reference, the housing 42 is a part of the brake actuator housing. The rod-like portion 18 of the piston 16 extends through the neck-like portion 40 and terminates in a wedge-shaped portion if the actuator 10 is used in the aforementioned wedge brake disclosed in U. S. Pat. No. 3,362,506, and engages an actuating lever if the the actuator 10 is used in an air-actuated disc brake of the type described in the aforementioned U. S. Pat. application No. 156,746.

A sleeve 44 is slidably mounted on the piston 16 and is slidable on the latter toward and away from an annular valve seating area 46 mounted on the plate-like portion 20. A bead 48 extends from one end of the sleeve 44 and is adapted to sealingly engage the valve seat 46 to prevent communication through passage means generally indicated by the numeral 50 which extends through the piston 16 and communicates the chamber 30 with the chamber 32. The passage 50 includes a flow-restricting orifice-like portion 52 which permits only limited fluid communication through the passage means 50 even when the bead 48 is moved out of engagement with the valve seat 46. An annular seal 54 is carried by the housing 12 and slidingly engages the outer circumferential surface of the sleeve 44. The seal 54 is designed such that the frictional engagement between the inner circumferential surface of the seal and the outer circumferential surface of the sleeve member 44 exerts a force on the latter to resist sliding movement of the latter. A return spring generally indicated by the numeral 56 is provided to return piston 16 when the brakes of the vehicle are released. The spring 56 engages a retainer member 58, yieldably urging one end of the latter into engagement with a shoulder 60 provided on the sleeve 44. The other end of the retainer 58 is yieldably urged into engagement with a detent 62 carried on the rod 18.

MODE OF OPERATION

When a brake application is effected, high pressure fluid is communicated into chamber 30 through the inlet port 34. High pressure fluid in the chamber 30 acts upon the right hand end of the diaphragm 22 and plate-like portion 20 to urge the piston 16 to the left, viewing the FIGURE. Movement of the piston 16 is transmitted to the brake actuating mechanism by the rod-like portion 18. Therefore, as the piston is urged to the left, a brake application is effected.

When fluid is initially communicated into the chamber 30, it is communicated into the chamber 32 through the passage 50 at a very restricted rate, because of the flow-restricting orifice 52. Therefore, a pressure buildup does occur in the chamber 30 to actuate the piston 16. As the piston 16 is moved to the left, the bead-like portion 48 extending from sleeve 44 sealingly engages the valve seat 46 to terminate communication through the passage means 50 to thereby completely seal the chamber 30 from the chamber 32. At the same time, the end of the retainer 58 moves away from shoulder 60 a distance equal to the distance that piston 16 moves relative to sleeve 44. This initial movement of the piston 16 relative to the sleeve 44 is permitted because the engagement of the seal 54 with the outer circumferential surface of the sleeve 44 provides sufficient frictional force to resist movement of the sleeve 44 with the piston 16. However, after the bead of 48 engages the valve seat 46, additional movement of the piston 16 carries the sleeve 44 with the piston. As the piston 16 moves to the left, the volume of the chamber 32 is appreciably reduced. The air in the chamber 32 is expelled to the exterior of the housing 12 through the one-way check valve 36.

When the brakes of the vehicle are released, the high pressure fluid in the chamber 30 is exhausted through the inlet port 34. The return spring 56, due to the engagement of the retainer 58 with the detent 62, urges the piston 16 to the right, viewing the FIGURE, until the valve seat 46 is moved a small distance away from the bead 48 of the sleeve 44, the sleeve being held against movement with the piston 16 by the frictional engagement of the seal 54 with the sleeve 44. When the valve seat 46 moves away from the bead 48, communication is again permitted through the passage means 50. The return spring 50, since the end of the retainer has been urged back into engagement with the shoulder 60 of the sleeve 44, urges the latter and the piston 16 to the right as a unit viewing the FIGURE until the diaphragm 22 engages the end of the housing 12 as illustrated in the FIGURE. During this return movement of the piston 16, fluid at atmospheric pressure in the chamber 30 is communicated into the chamber 32 through the passage means 50 to prevent creation of a pressure void in the latter. Of course, atmospheric air is prevented from being drawn into the chamber 32 by the check valve 36.

It will be noted that during the operation of my device, that not only is atmospheric air prevented from being communicated into the chamber 32, but also the fluid in chamber 30 which is communicated into the chamber 32 during release of the brake purges the latter of contaminants, thereby assuring proper operation of the device. In prior art devices, a bleed hole had to be provided which communicated the chamber 32 to the exterior of the housing at all times, to permit air to be expelled from the chamber during a brake application. Similarly, the bleed opening permitted atmospheric air, with all the contaminants carried thereby, to be communicated into the chamber 32 during release of the brake to prevent creation of a pressure void in the chamber.

I claim:

1. In a fluid actuator:
a housing defining a compartment therewithin;
piston means slidably mounted in said compartment and dividing the latter into a pair of chambers;
means for admitting pressurized fluid into one of said chambers to thereby drive said piston means in an actuating direction;
resilient means returning said piston means upon release of said pressurized fluid;
passage means extending through said piston means to communicate said chambers;
first valve means responsive to movement of said piston means to close said passage means when said piston means is driven in said actuating direction and maintaining said passage means closed until after termination of movement of the piston means in the actuating direction, but opening said passage means to permit communication between said chambers when said resilient means returns said piston means;
and second valve means permitting communication between the other chamber and the exterior of the housing, but preventing communication in the reverse direction,
said first valve means including slidable means slidably carried by said piston means and moving into sealing engagement with the latter to prevent communication through said passage means when said piston means is urged in the actuating direction, but sliding relative to the piston means to open said passage means when the piston means is urged in the return direction; and
resisting means carried by said housing and engaging said slidable means to resist sliding movement of the latter.

2. The invention of claim 1:
said slidable means being an annular member circumscribing said piston means;
said resisting means including an annular seal carried by said housing and slidably and frictionally engaging the outer circumferential surface of said annular member.

3. In a fluid actuator:
a housing defining a compartment therewithin;
piston means slidably mounted in said compartment and dividing the latter into a pair of chambers;
means for admitting pressurized fluid into one of said chambers to thereby drive said piston means in an actuating direction;
resilient means for urging said piston means in a return direction upon release of said pressurized fluid in said one chamber;
passage means extending through said piston means to communicate said chambers;
slidable means slidably carried on said piston means and shiftable relative to the latter from a first position permitting communication through said passage means to a second position closing said passage means;
said slidable means being responsive to movement of said piston means to move from said first position to said second position when movement of said piston in the actuating direction is initiated, remaining in said second position during further movement of said piston means in said actuating direction, shifting from said second position to said first position when movement of the piston means in said return direction is initiated, and remain-ing in said first position during movement of the piston means in said return direction;

said slidable means being a sleeve circumscribing said piston means; and an annular seal circumscribing said sleeve and frictionally engaging the sleeve to resist movement of the latter.

* * * * *